US006203177B1

(12) United States Patent
Watanabe et al.

(10) Patent No.: US 6,203,177 B1
(45) Date of Patent: Mar. 20, 2001

(54) LAMP FOR VEHICLE

(75) Inventors: Shigeyuki Watanabe; Satoshi Yamamura; Masahiro Kusagaya; Masayoshi Unno, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/395,825

(22) Filed: Sep. 14, 1999

(30) Foreign Application Priority Data

Sep. 16, 1998 (JP) ................................................ 10-261099

(51) Int. Cl.$^7$ ....................................................... B60Q 1/02

(52) U.S. Cl. ............................................ 362/351; 362/539

(58) Field of Search .................................... 362/351, 509, 362/539, 343

(56) References Cited

U.S. PATENT DOCUMENTS

| | | | |
|---|---|---|---|
| 4,926,301 | 5/1990 | Liverance et al. . | |
| 5,067,054 | 11/1991 | Oshio et al. . | |
| 5,782,550 | 7/1998 | Ohashi et al. . | |
| 6,007,221 | * 12/1999 | Taniuchi et al. | 362/465 |
| 6,079,860 | * 6/2000 | Ito | 362/509 |
| 6,132,068 | * 10/2000 | Katsumata | 362/351 |

FOREIGN PATENT DOCUMENTS

| | | |
|---|---|---|
| 1235209 | 6/1971 | (GB) . |
| 2325517 | 11/1998 | (GB) . |

* cited by examiner

*Primary Examiner*—Thomas M. Sember
(74) *Attorney, Agent, or Firm*—Koda & Androlia

(57) ABSTRACT

A lamp for a vehicle having a metallic light shielding shade that comprises a shade body serving as a light shielding section and a leg which extends rearward from the shade body in substantially a horizontal direction so that the light shielding section supported in a cantilever manner when the rear end of the leg is inserted and secured to a leg insertion hole formed in a reflector of the lamp, wherein the leg of the light shielding shade is obtained by laminating two plate-like extending portions that have expanded portions; and holding grooves are formed in the leg insertion hole. When the expanded portions are press-fitted into the holding grooves from the front side of the reflector, the leg is inserted in the leg insertion hole, and the rear end of the extending leg is bent so as to be on the rear surface of the reflector; as a result, the leg of the light shielding shade is securely held in the leg insertion hole of the reflector. The leg is formed by laminating two plate-like extending portions so as to have a high rigidity, realizes excellent light distributing characteristics, and prevents deflection of light distribution.

18 Claims, 8 Drawing Sheets

FIG. 13-(a)

*PRIOR ART*

FIG. 13-(b)

*PRIOR ART*

LAMP FOR VEHICLE

BACKGROUND OF THE INVENTION

1. Field of the Invention

The present invention relates to a lamp for a vehicle, and more particularly, to a lamp chamber of a vehicle lamp provided therein with a light shielding shade that prevents exposure of a light source.

2. Prior Art

FIG. 12 illustrates a conventional headlamp in cross section.

In FIG. 12, the reference numeral 1 represents a lamp body, the reference numeral 2 represents a front lens and the reference numeral 3 represents a parabolic reflector. A lamp chamber defined by the lamp body 1 and the front lens 2 accommodates the reflector 3; and a bulb 4 serving as a light source is installed in the reflector 3 and secured therein. Furthermore, a light shielding shade 5 is secured to the reflector 3.

As shown in FIG. 13(*a*), the light shielding shade 5 comprises a shade body 6 and a leg 7 which are integrally formed. The shade body 6 shields a part of the light from the bulb 4 so as to contribute to forming a light distribution, and the leg 7 substantially horizontally extends toward the rear of the shade body 6. The light shielding shade 5 is usually formed by a combination of the processes of drawing, cutting and bending a thin metal plate made of an iron alloy or the like. When the light shielding shade 5 is installed, the leg 7 is set so as to penetrate a leg insertion hole 3*b* (a cut portion provided in a bulb insertion hole 3*a*) of the reflector 3; and an L-shaped bent portion 8 at the rear end of the leg 7 is secured with a screw 9 to a predetermined position on the rear surface of the reflector 3. Thus, the light shielding shade 5 is installed in a cantilever fashion.

FIG. 13(*b*) shows another type of a light shielding shade 5A. This shade 5A comprises the shade body 6 and two legs 7*a* and 7*b* which extend from the shade body 6. Ends of the extending portions of the legs 7*a* and 7*b* are crimped on the rear surface of the reflector 3; as a result, the light shielding shade 5A is secured thereon.

The headlamp that includes the foregoing light shielding shade 5, however, requires the screw 9 for mounting the light shielding shade 5. Therefore, the problem is that it requires an increased number of elements and it also requires a complicated process for mounting the light shielding shade 5 on the reflector 3.

Since the light shielding shade 5 is supported by one leg 7 in the cantilever manner, the light shielding shade 5 tends to vertically vibrate while the vehicle is running. Thus, another problem is that the leg 7 tends to suffer fatigue failure, causing deviation of light distribution of the bulb of the lamp.

On the other hand, the headlamp that includes the light shielding shade 5A requires a complicated process for securing the two legs 7*a* and 7*b*. Since the two legs 7*a* and 7*b* cause dimming, the problem is that effective use of the light is prevented.

SUMMARY OF THE INVENTION

In view of the foregoing prior art, an object of the present invention is to provide a lamp for a vehicle incorporated therein with a light shielding shade that can easily be mounted, exhibiting satisfactory durability and minimal vibrations.

So as to accomplish the object, the present invention is made for a lamp for a vehicle that includes a lamp chamber which accommodates therein a reflector, a light source disposed in front of the reflector and a light shielding shade disposed in front of the light source, and the light shielding shade is formed by integrating a shade body serving as a light shielding section and a leg extending rearwards from the shade body in substantially a horizontal direction, both of which being made of a thin metal plate and integral to each other, so that the rear end of the leg is inserted and secured in a cantilever manner to a leg insertion hole, which is provided in the reflector and extends in a longitudinal direction of the reflector, and in the present invention, the leg of the light shielding shade is formed by laminating two plate-like extending portions, expanded portions oppositely expanding outward and extending in a direction in which the leg extends are formed in substantially a central portion in a widthwise direction of the plate-like extending portions, and holding grooves for holding the expanded portions of the leg are formed in the leg insertion hole; so that a rear end portion of the extending leg inserted from the front portion of the reflector to a predetermined insertion limit in the leg insertion hole is bent on the rear surface of the reflector, thus securing the leg in the leg insertion hole.

With the structure above, the expanded portions of the plate-like extending portion can serve as plate springs; accordingly, press-fitting of the expanded portions from the front portion of the reflector enables the leg to be inserted into the leg insertion hole.

The rear end portion of the leg inserted from the front portion of the reflector to a predetermined insertion limit in the leg insertion hole is bent on the rear surface of the reflector. Thus, the leg of the light shielding shade is positioned and secured in the longitudinal direction thereof.

Since the expanded portions can serve as the plate springs and are pressed against the holding grooves when the expanded portions extending in the longitudinal direction of the leg are held by the holding grooves, the leg of the light shielding shade is positioned vertically and horizontally, and an undesirable rotation can be prevented.

Further, the leg of the light shielding shade comprises two plate-like extending portions, and these extending portions are laminated Thus, compared to the conventional leg which is formed with one plate-like extending portion, the leg of the present invention has a higher rigidity and strength for supporting the shade body in the cantilever manner.

The rear end portion of the leg (or of the plate-like extending portion) is inserted into the leg insertion hole and is bent so that the leg is secured to the inside of the leg insertion hole. Therefore, mounting of the leg (the light shielding shade) can easily be performed, compared to the conventional screw fixing method. Since no screw is required, the number of required elements can be reduced in the present invention.

Furthermore, in the present invention, each of the plate-like extending portions which constitute the leg of the light shielding shade is formed so as to have a cross section of a wedge shape that face sideways (“<” and “>”) so that the plate-like extending portions project outwards.

With this structure, not only the plate-like extending portions but also the expanded portions as a whole serve as plate springs, allowing the expanded portions to be press-fitted in the holding groove smoothly. Moreover, the pressure of contact between each of the expanded portions and holding groove can be increased.

In the present invention, further, each of the expanded portions is formed into a circular arc shape, each of the holding grooves is formed so as to have a circular-arc shape which substantially fits to the outside shape of the expanded portion, and a plurality of recess grooves that extend in a longitudinal direction of the holding grooves are formed in the inner surface of the holding groove at substantially the same intervals in the circumferential direction of the holding groove.

Accordingly, the substantially overall outer surface of each expanded portion is held by the holding groove. Thus, a great contact force (holding force) is exerted on the space between the expanded portion and the holding groove, and the undesirable rotation of the leg can reliably be prevented.

The overall inner surface of the holding groove in the circumferential direction is not pressed by each expanded portion, and the frictional resistance which is produced when the expanded portions are press-fitted into the holding grooves can be lowered.

A plurality of areas of the holding groove formed at the same intervals in the circumferential direction, except for the recess groove region, press each of the expanded portions. Therefore, the contact force produced between each expanded portion and the holding groove can be uniform in the circumferential direction.

Even if the circular-arc portion of each expanded portion has an irregularity (error), the plural portions of the holding grooves formed at the same intervals in the circumferential direction, except for the recess groove, inevitably press each of the expanded portions. Therefore, the expanded portions of the leg can reliably be held.

Furthermore, in the present invention, the rear end of each of the plate-like extending portions have tongue-shaped areas having cut portions formed opposite to each other in the widthwise direction so as not to overlap each other.

Since the tongue-shaped areas of the rear end of the leg (the plate-like extending portion) do not overlap, the tongue-shaped areas can easily be bent on the rear surface of the reflector.

In addition, in the present invention, the widthwise direction of each plate-like extending portion that constitutes the leg of the light shielding shade is made to be vertical.

Each of the conventional legs (shown in FIGS. 12 and 13) has its plane region disposed in a horizontal direction (directed so that the region faces the light source) and therefore, a large portion of light which travels to the effective reflecting surface of the reflector is undesirably shielded. However, in the present invention, the widthwise direction of the plate-like extending portion is made to be vertical. As a result, the plane region of the leg is parallel to the direction of light traveling toward the effective reflecting surface of the reflector; and therefore, only a small quantity of light is shielded by the leg, and the quantity of light reflected by the effective reflecting surface of the reflector can increase.

Generally, vibrations are produced while a vehicle is running and causes the light shielding shade to vibrate in the vertical direction. The plate-like extending portion constituting the leg of the light shielding shade of the present invention is structured so that its widthwise direction is set to be vertical. Accordingly, high rigidity and strength can be realized in the direction to which the load exerts (in a direction of the vibrations), and vertical vibrations of the light shielding shade can be prevented.

Furthermore, in the lamp for a vehicle of the present invention, the front surface of the reflector is formed with a boss that project forward and has the leg insertion hole, bent engaging claws that make the leg to be a T shape are disposed at corresponding side ends of the plate-like extending, portions that constitute the leg, and right-angle stepped portions for setting a distance of insertion of the leg are formed on the front end of the boss so that when the leg is inserted into the leg insertion hole the right-angle stepped portions contact and engage the engaging claws so as to serve as an insertion limit.

Accordingly, by merely inserting the leg of the light shielding shade into the leg insertion hole, the engaging claws of the leg abut against the right-angle stepped portions of the boss. Thus, the leg can automatically be inserted into an appropriate insertion position.

Further, the engaging claws form the leg, which is obtained by laminating the plate-like extending portions, into a T shape as a whole so as to enhance the rigidity and strength of the leg; and the engaging claws and the right-angle stepped portions of the boss contact and engage each other so as to serve as a means for positioning the leg in the circumferential direction.

In the present invention, furthermore, the reflector is provided with a light-source insertion hole for holding the light source therein, and the leg insertion hole is formed by a slit that opens in the side surface of the light-source insertion hole.

Thus, the leg insertion hole, which is molded simultaneously with the process for molding the reflector by a synthetic resin (which is usually injection molding), can communicate with the light-source insertion hole. Thus, the molding surface of a mold for molding the reflector can easily be machined, and excellent moldability of the leg insertion hole (the slit) and holding groove can be realized.

In addition, according to the present invention, the shade body is comprised of a cap-shape designed portion for shielding direct light directly radiated forwards from the light source and a skirt portion formed into a skirt-like shape around the designed portion so as to shield light which travels to a non-effective reflecting surface; and further, the skirt portion is obtained by bending a plurality of elongated and divided portions that radially extend from the outer periphery of the designed portion.

For this structure, a drawing of a thin metal plate is performed to form the cap-shape designed portion of the shade body and the expanded portions of the leg, and this metal plate is punched (cut), so that the plural elongated and divided portions and a pair of plate-like extending portions are formed around the designed portion; then, a bending work is performed so as to form the elongated and divided portions into the skirt-like shape, and each of the plate-like extending portions are put on the other (or they are laminated). The light shielding shade is thus obtained.

Furthermore, in the present invention, the right-angle stepped portions which are for setting the distance of insertion of the leg and provided in the boss are formed at predetermined offset positions in the longitudinal direction of the reflector so as to correspond to the differences in the size of the effective reflecting surface of the reflector and in the F value.

Generally, for the reflectors having the same F value, it is preferable that the light shielding shades are positioned forwards as the effective reflecting surfaces are enlarged. For the reflectors having the same size, it is preferable that the light shielding shades are positioned forwards as the F values are small. In the structure of the present invention, by varying the positions of the right-angle stepped portions of the boss in the longitudinal direction of the reflector, the position of (the skirt portion) of the light shielding shade is changed in the longitudinal direction of the reflector. Accordingly, by forming the right-angle stepped portions at appropriate positions so as to correspond to the differences in the size of the effective reflecting surface and the F value of reflectors, the same light shielding shade can be used for reflectors of different effective reflecting surfaces or F values.

Lastly, in the lamp for a vehicle of the present invention, the right-angle stepped portions are formed at predetermined positions in the longitudinal direction of the reflector so that a contact and engagement of the engaging claws of the leg of the light shielding shade to the right-angle stepped portions causes the outer periphery of the shade body to be positioned on a straight line which connects a predetermined position adjacent to the central portion of the light source and a parting line of the effective reflecting surface of the reflector.

With this structure, the outer periphery of (the skirt portion of) the light shielding shade positionally corresponds to the parting line of the effective reflecting surface of the reflector. Accordingly, by setting the positions of the right-angle stepped portions so that the outer periphery of (the skirt portion of) the light shielding shade positions on the straight line which connects a predetermined position adjacent to the central portion of the light source and the parting line of the effective reflecting surface, the positions of the right-angle stepped portions can be specified for each reflector of different shapes.

BRIEF DESCRIPTION OF THE DRAWINGS

FIGS. 13(*a*) and 13(*b*) are perspective views each showing a light shielding shade used in the conventional lamp of FIG. 12.

DETAILED DESCRIPTION OF THE PREFERRED EMBODIMENTS

Figure 1:
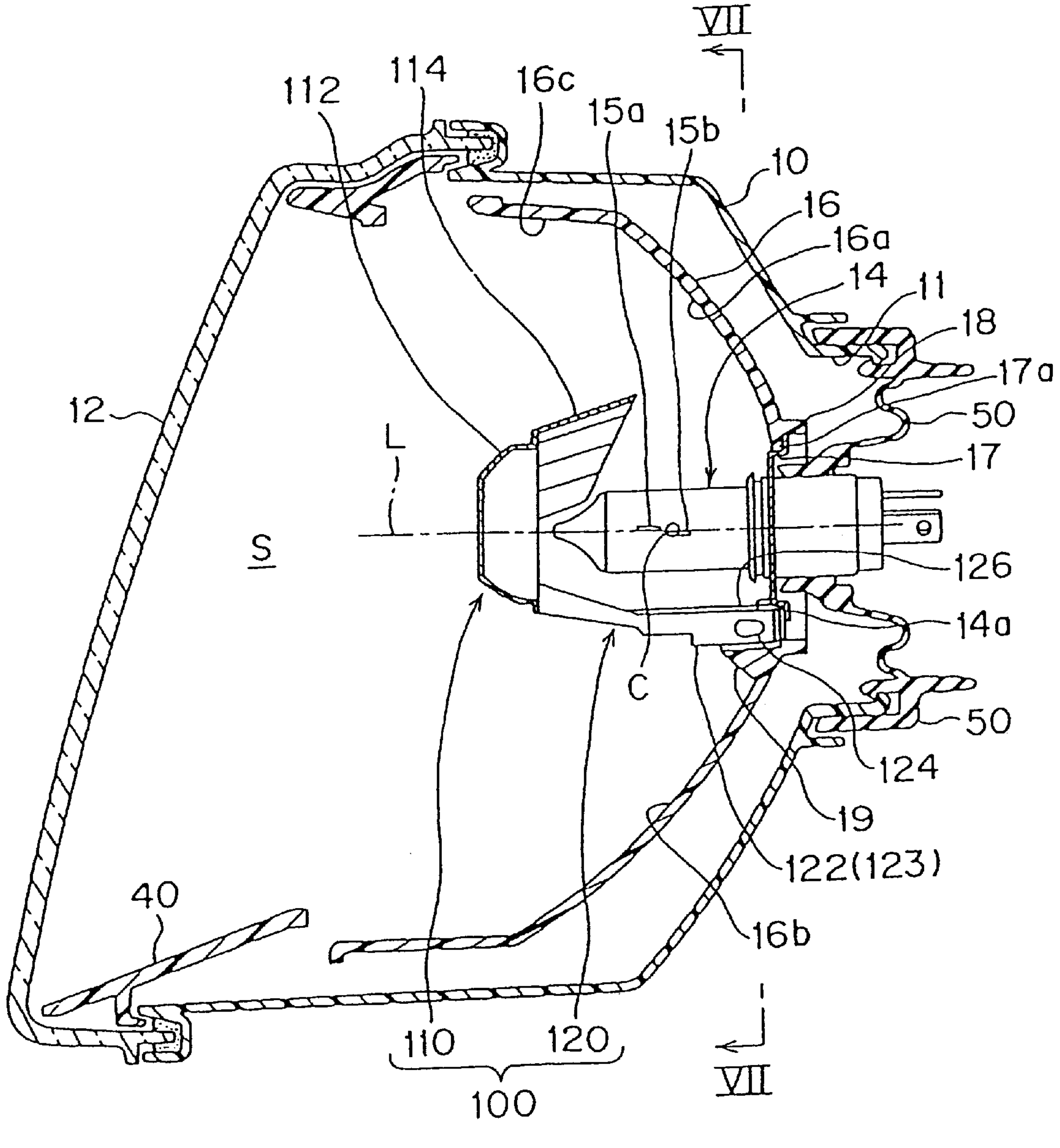
FIG. 1 is a vertical cross sectional view of the headlamp for an automobile according to one embodiment of the present invention.

Embodiments of the present invention will now be described below with reference to the accompanying drawings.

In the drawings, the reference numeral 10 represents a lamp body formed into a cup shape. The lamp body 10 is open in the front (left side in FIG. 1) and made of a synthetic resin. The open front of the lamp body 10 is covered by a front lens 12 so that a lamp chamber 5 is formed by the lamp body 10 and the front lens 12. The lamp chamber 5 accommodates a bulb 14 that serves as a light source, a reflector 16 that has been subjected to an aluminum evaporating process and forwards the reflecting light of the bulb 14, and a light shielding shade 100 disposed so as to be in front of and underneath the bulb 14. The light shielding shade 100 is provided so as to shield light that travels to regions (for example, front, upper non-effective reflecting surface 16*c*) other than effective reflecting surfaces 16*a*and 16*b* of the reflector 16.

The bulb 14 and the light shielding shade 100 are integrated to the reflector 16 which is supported by an aiming mechanism (not shown). By operating the aiming mechanism, the direction of the reflector 16 (in other words, the optical axis L of the headlamp) is adjusted in horizontal and vertical directions in a tilting fashion.

The reflector 16 is formed into the cup-shape having parabolic effective reflecting surfaces 16*a* and 16*b* and is provided with a bulb insertion hole 17 formed in the bottom portion thereof Into this bulb insertion hole 17, the bulb 14 which includes a front low-beam-forming filament 15*a* and a rear main-beam-forming filament 15*b* is mounted.

The reference numeral 14*a* represents a focal-point ring disposed in the front portion of the bulb base of the bulb 14. When the focal-point ring 14*a* is engaged with an annular focal-point-ring engaging portion 17*a* formed in the periphery of the bulb insertion hole 17 of the reflector 16, the center C of the bulb 14 is aligned to the position of the focal point of each of the effective reflecting surfaces (the parabolic surfaces) 16*a* and 16*b* of the reflector 16.

Figure 5:
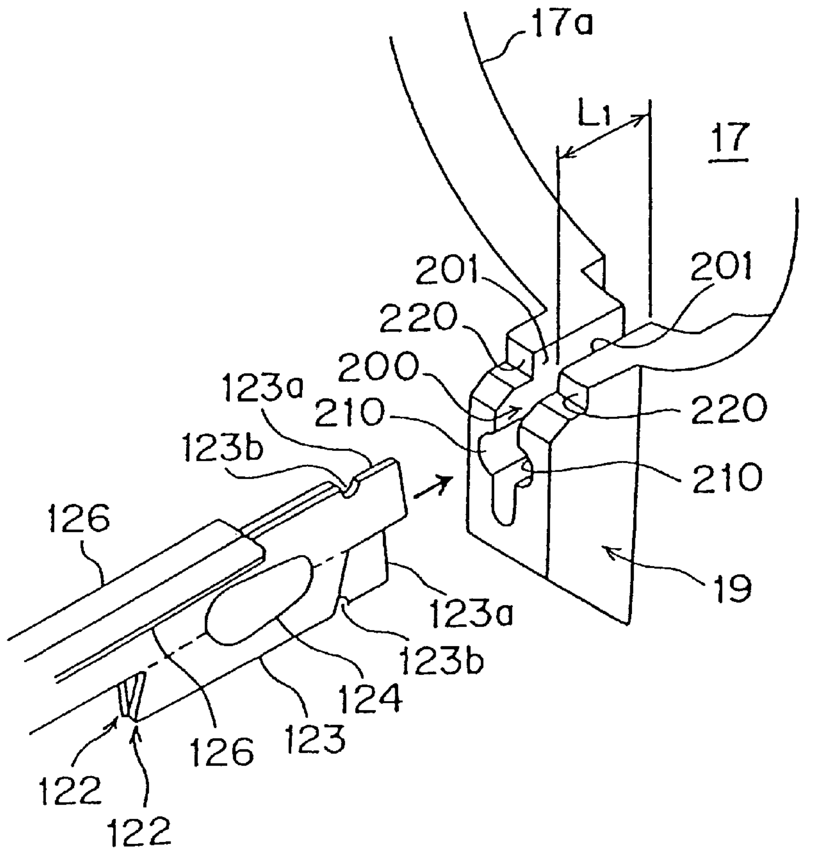
FIG. 5 is a perspective view in which a leg of the light shielding shade is about to be inserted into a leg insertion hole of a reflector.
Figure 6:
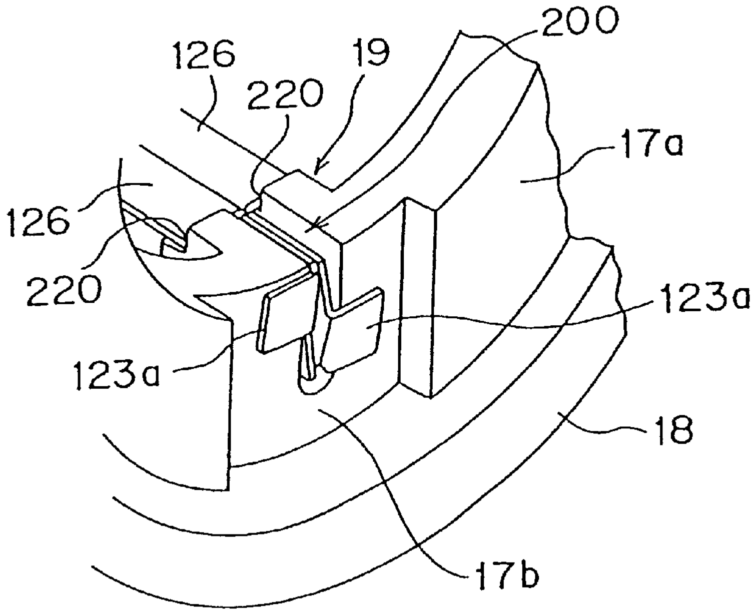
FIG. 6 is a perspective view of the leg insertion hole into which the leg of the light shielding shade has been inserted as viewed from the opposite side from FIG. 5.

Furthermore, as best seen from FIGS. 5 and 6, a cylindrical portion 18 in the form of a vertical wall is formed around the focal-point-ring engaging portion 17*a* on the rear surface of the reflector 16. A boss 19 in the form of a rectangular block is formed so as to project over the lower portion of the outer surface of the bulb insertion hole 17 in the front surface of the reflector 16. The boss 19 is formed with a leg insertion hole 200. The leg insertion hole 200 penetrates the boss 19 in the longitudinal direction of the reflector and has a slit shape opened below the bulb insertion hole 17. The light shielding shade 100 is inserted and secured into this leg insertion hole 200 as shown by the arrow in FIG. 5.

Figure 2:
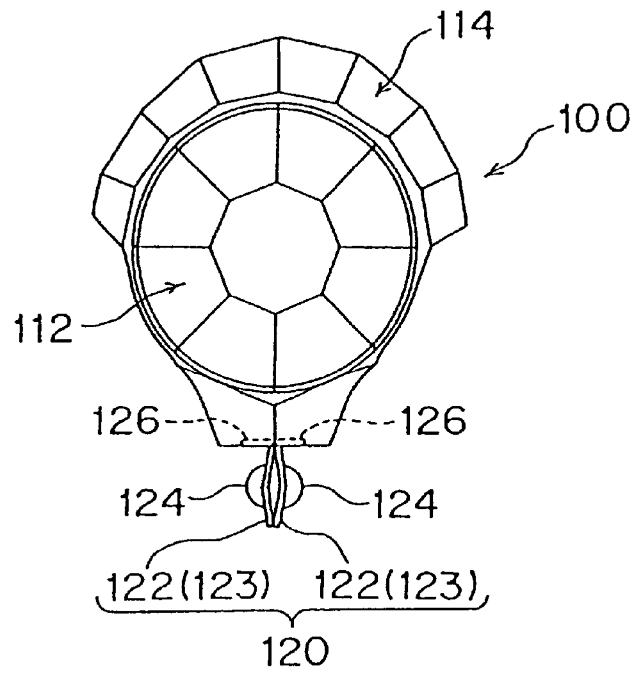
FIG. 2 is a front view of the light shielding shade used in the headlamp.
Figure 3:
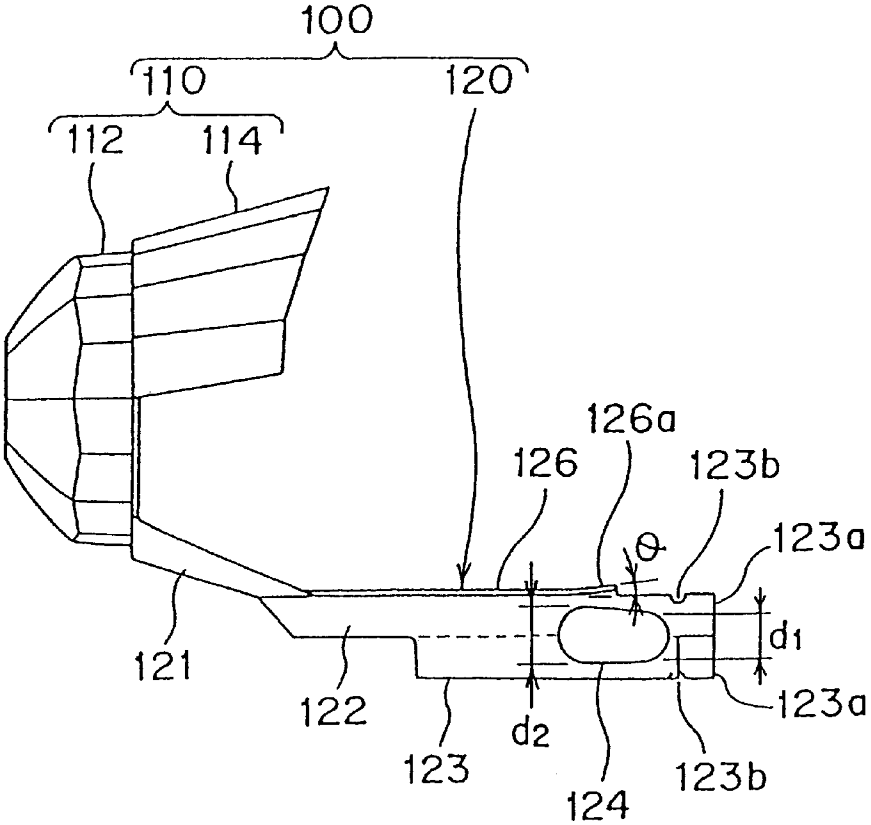
FIG. 3 is a side view of the light shielding shade.

As best seen from FIGS. 1 through 3, the light shielding shade 100 comprises a shade body 10 serving as a light shielding section and a leg 120 extending substantially horizontally in the rear direction from the shade body 110. The light shielding shade 100 and the leg 120 are integrally formed from a thin metal plate. When the rear end of the leg 120 is inserted and secured into the leg insertion hole 200 of the reflector 16, the light shielding shade 100 is supported by the reflector 16 in a cantilever manner.

More specifically, the leg 120 of the light shielding shade 100 is formed by laterally laminating two plate-like extending portions 122 that extend rearward from the shade body 10. Compared to the structure in which the leg is formed by one plate-like extending portion, a leg with higher rigidity and strength for supporting the shade body 110 by the cantilever manner can be obtained. The reference numeral 121 (see FIG. 121) represents a bent horizontal plate portion located between the plate-like extending portions 122 and the shade body 110.

The plate-like extending portions 122 of the leg 120, each of which being formed into a wedge shape ("<") facing sideways as best seen from FIG. 2, are laminated so that concave surfaces 122*a* (see FIG. 7) of the wedge shape plate-like extending portions 122 are disposed to face each other. In addition, the plate-like extending portions 122 have widened portions 123; and oppositely expanded portions 124 are formed in substantially the center in the widthwise direction of the widened portions 123. The expanded portions 124 are formed so as to expand outward (see FIG. 2), to be elongated in the lengthwise direction of the extending portions 122 (see FIG. 3) and to have a circular-arc horizontal cross section (see FIG. 8); and they are located adjacent to the ends of the plate-like extending portions 122.

On the other hand, in the boss 19 of the reflector 16, a pair of right and left side walls 201 (see FIGS. 5 and 7) that constitute the leg insertion hole 200 of the boss 19 are formed; and these side walls 201 are formed with opposite holding grooves 210 arranged so as to hold the expanded portions 124 of the leg 120 of the light shielding shade 100. Each of the holding grooves 210 has a circular-arc surface. When the expanded portions 124 are press-fitted into the holding grooves 210 from the front side of the reflector 16 as shown by the arrow in FIG. 5 ("the front side" of the reflector 16 being on the left side of the reflector in FIG. 1), the expanded portions 124 extending in the longitudinal direction of the leg 120 are elastically held by the holding grooves 210 of the leg insertion hole 200. The expanded portions 124 and the plate-like extending portions 122 act, as a whole, as a plate spring so as to be pressed against the holding grooves 210. Thus, the leg 120 of the light shielding shade 100 is positioned and secured in the lateral and vertical directions; and in addition, undesirable rotation of the leg 120 is prevented.

Each of the expanded portions 124 is, as shown in FIG. 3, tapered (d1<d2) so that the width is reduced in the direction from the tail end (having the width d2) to the leading end (having the width d1). As seen from FIG. 4, the amount of (horizontal or lateral) projection of each of the expanded portions 124 on the plate-like extending portions 122 is reduced (h1<h2) in the direction from the tail end (having the height h2) toward the leading end (having the height h1). Also, as seen from FIG. 8, the distance between the opposite holding grooves 210 is reduced (W1<W2) in the direction from the front side (having the width W2) toward the back side (having the width W1) of the reflector 16. Thus, the expanded portions 124 can be smoothly press-fitted in the holding grooves 21.

Figure 7:
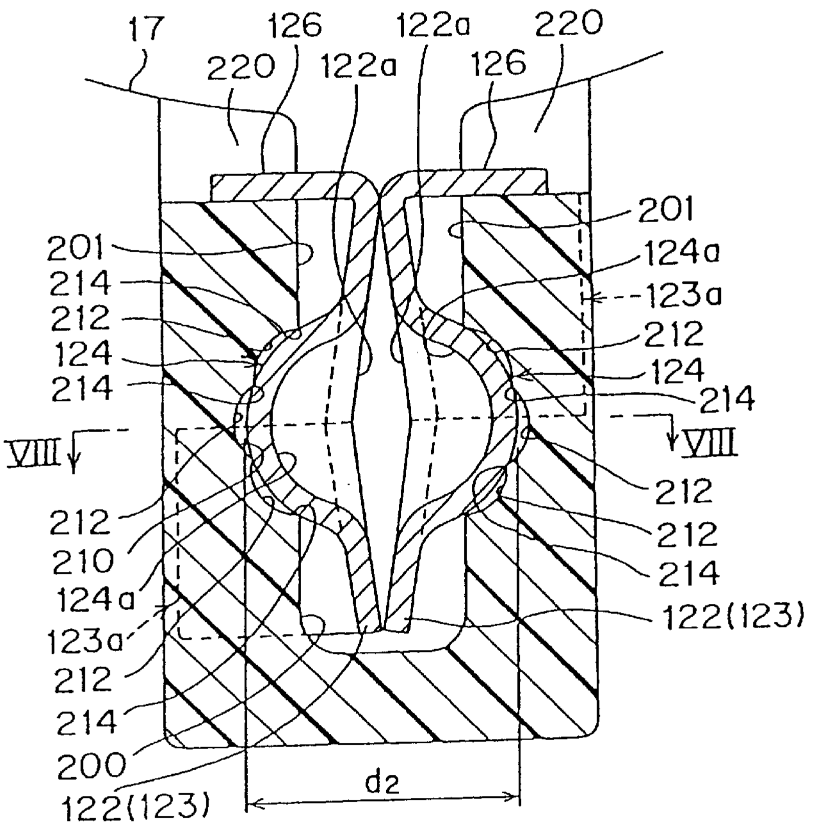
FIG. 7 is an enlarged vertical cross sectional view of the leg of the light shielding shade inserted into the leg insertion hole.
Figure 8:
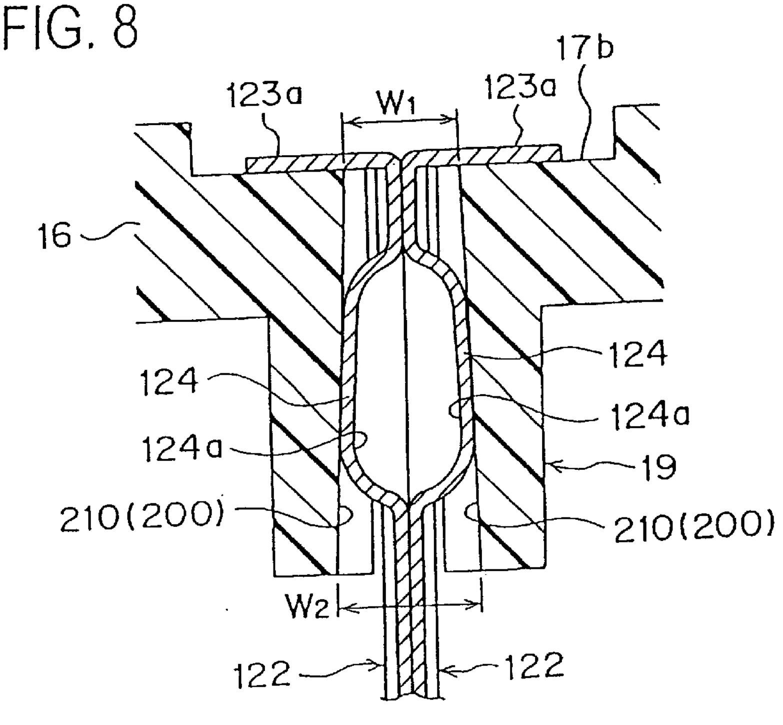
FIG. 8 is a cross sectional view taken along the line VIII—VIII in FIG. 7, showing the leg of the light shielding shade inserted into the leg insertion hole.

As seen from FIGS. 5 and 7, flange-shaped engaging claws 126 are formed on the upper ends of the plate-like extending portions 122 so that the engaging claws 126 perpendicularly extend outwards and make the horizontal cross sectional shape of the leg 120 to be a T shape, thus enhancing the rigidity and strength of the leg 120. When the leg 120 is inserted into the leg insertion hole 200 of the boss 19 of the reflector 16 and, as a result, the light shielding shade 100 is brought into abutment against right-angle stepped portions 220 formed in the front end of the boss 19 so as to limit the distance of insertion of the leg 120, the engaging claws 126 set the distance of insertion of the leg 120 into the leg insertion hole 200. The engaging claws 126 also serve as members that position the leg 120 (that is, the light shielding shade 100) in the circumferential direction.

As seen from FIG. 3, end portions 126*a* of the engaging claws 126 which abut against the stepped portions 220 of the boss 19 are inclined (by an angle of θ degrees) diagonally upwards in the direction in which the leg 120 extends. With this structure, separation of the aluminum evaporated surface of each of the stepped portions 220 by the engaging claws 126 when the leg 120 is inserted into the leg insertion hole 200 is prevented.

Furthermore, the plate-like extending portions 122 (123) are formed at the end thereof with tongue-shaped areas 123*a* having opposite cut portions in the widthwise direction so that the thus made two tongue-shaped areas 123*a* do not overlap when the extending portions 122 are laminated. As shown in FIG. 6, the tongue-shaped areas 123*a* are bent at the leading end of the leg 120 and outward in the lateral direction, so that the thus bent tongue-shaped areas 123*a* are located on the rear surface of the reflector 16 at positions (the portion at which the leg 120 is positioned in its longitudinal direction) where the engaging claws 126 come into contact with the right-angle stepped portions 220 and are engaged thereto. As a result, the leg 120 of the light shielding shade 100 is positioned and secured in its lengthwise direction or in its front-to-rear direction.

The reference numeral 17*b* in FIG. 6 represents a recess formed in the focal-point-ring engaging portion 17*a* of the reflector 16; and the tongue-shaped areas 123*a* of the leg 120 of the light shielding shade 100 are bent so as to be located on the surface of the recess 17*b*. Therefore, undesirable interference between the focal-point ring 14*a* (see FIG. 1) of the bulb 14 engaged with the focal-point-ring engaging portion 17*a* and the tongue-shaped areas 123*a* of the light shielding shade 100 is prevented The reference numerals 123*b* represent cut portions formed in the base area of each one of the tongue-shaped areas 123*a*. The cut portions 123*b* are formed so that the tongue-shaped areas 123*a* are easily bent.

The leg insertion hole 200 of the boss 19 of the reflector 16 has a size which allows free engagement of the plate-like extending portions 122. Moreover, the inner surface of each of the holding grooves 210 is formed into a circular-arc shape which substantially fits to each of the expanded portions 124 of the leg 120 of the light shielding shade 100 so that the holding grooves 210 are capable of holding the overall bodies of the expanded portions 124 of the leg 120.

As shown in FIG. 7, the inner surfaces of the holding grooves 210 of the boss 19 of the reflector 16 are formed with four linear recesses 212 which are substantially equally spaced in the circumferential direction of the holding grooves 210 and extend in the front-to-rear direction of the boss 19. Thus, only four contact portions 214 equally spaced in the circumferential direction of the holding grooves 210 come into contact and press the expanded portions 124. Accordingly, the contact force generated between the expanded portions 124 and the holding grooves 210 becomes uniform in the circumferential direction; and as a result, the leg 120 of the light shielding shade 100 can reliably be held in position. In other words, even if each of the expanded portions 124 which is a circular-arc shape is deformed and/or even if the expanded portions 124 have somewhat of an irregularity (or an error), the contact portions 214 of the holding grooves 210 in the circumferential direction inevitably can come into contact with and press the expanded portions 124. Therefore, the expanded portions 124 are reliably held in the boss 19.

The leg 120 (the plate-like extending portions 122) of the light shielding shade 100 is structured so that the widthwise directions of the plate-like extending portions 122 are oriented in a vertical direction. Therefore, the plane region of each of the plate-like extending portions 122 is in parallel to the direction in which light travels from the bulb 14 toward the lower effective reflecting surface 16*b* of the reflector. Thus, the light from the bulb 14 is almost not interfered by the leg 12; and as a result, the quantity of light reflected by the lower effective reflecting surface 16*b* of the reflector can be enlarged, producing a bright main beam.

Vibrations produced during a vehicle is running might cause the light shielding shade 100 to vibrate in the vertical direction. However, the leg 120 (the plate-like extending portions 122) of the present invention is structured so that its widthwise direction is set in the vertical direction. Accordingly, high rigidity and strength can be realized in the direction to which the load from the vibration is exerted, and vertical vibrations of the light shielding shade 100 can be prevented, providing appropriate light distribution without any vertical deflections.

As best seen from FIGS. 2 and 3, the shade body 10 of the light shielding shade 100 comprises a cap-shape designed portion 112 and a skirt portion 114. The cap-shape designed portion 112 shields direct light emitted from the bulb 14 and directly travels forwards. The skirt portion 114 that is formed into a skirt shape around the designed portion 112 shields light traveling toward the non-effective reflecting surface 16*c* in the upper portion of the reflector 16. As seen from FIG. 9, the skirt portion 114 is formed into the skirt shape by bending a plurality of elongated and divided members 115 radially extending from the outer periphery of the designed portion 112 and by abutting the side ends of the elongated and divided members 115.

Figure 4:
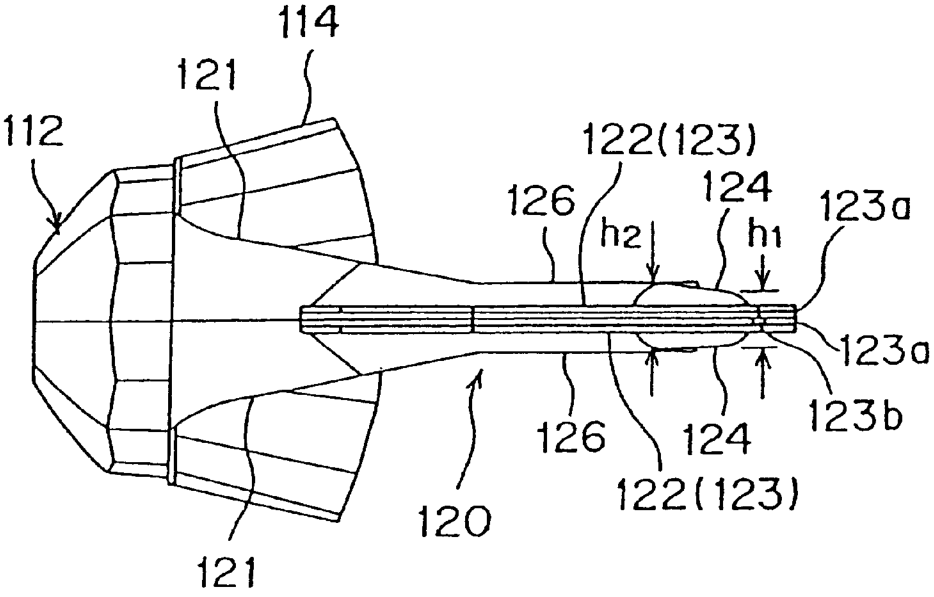
FIG. 4 is a bottom view of the light shielding shade.
Figure 9:
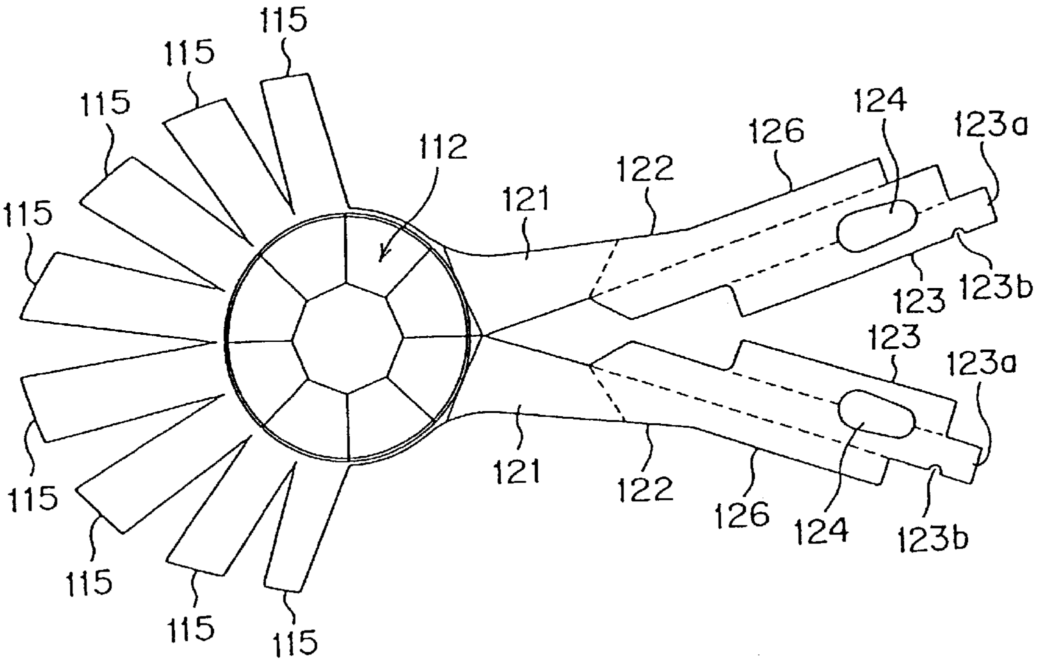
FIG. 9 is a top view of the light shielding shade in which the skirt portion of the light shielding shade is developed.

More specifically, the cap-shape designed portion 112 and the expanded portions 124 are formed from a thin metal plate by performing a drawing work. Then, the thin metal plate is punched so as to form the plurality of elongated and divided members 115 radially extending from the peripheral portion of the designed portion 112 and the pair of the plate-like extending portions 122 extending from the designed portion 112, as shown in FIG. 9. Then, a bending process is performed so as to form the elongated and divided members 115 into the skirt shape, and the plate-like extending portions 122 are bent at predetermined positions and laminated together. As a result, the light shielding shade 100 shown in FIGS. 2 to 4 is obtained.

The light shielding shade 100 is made to be a common shape regardless of the difference in the size and the F value of each of the effective reflecting surfaces 16*a* and 16*b* of the reflector 16. On the other hand, the position L1 of each of the right-angle stepped portions 220 which is for setting the distance of insertion of the leg 120 and is provided in the boss 19 of the reflector 16 is offset in the longitudinal (front-to-rear) direction of the reflector 16 so as to comply with the difference in the size and the F value of the effective reflecting surface 16*a* of the reflector 16.

Figure 10:
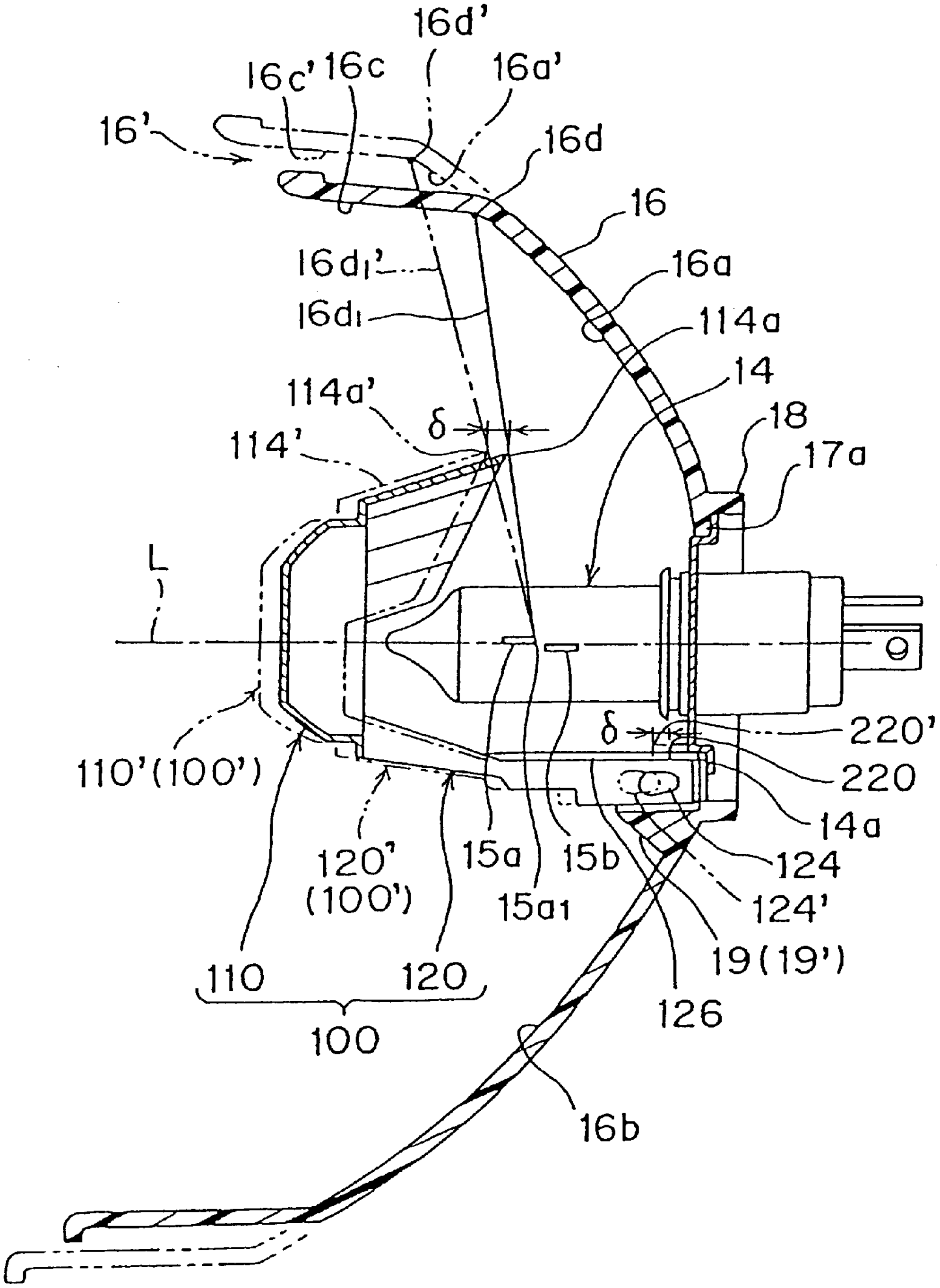
FIG. 10 is a diagram showing that the light shielding shade can be used in a reflector having a different effective reflecting surface.
Figure 12:
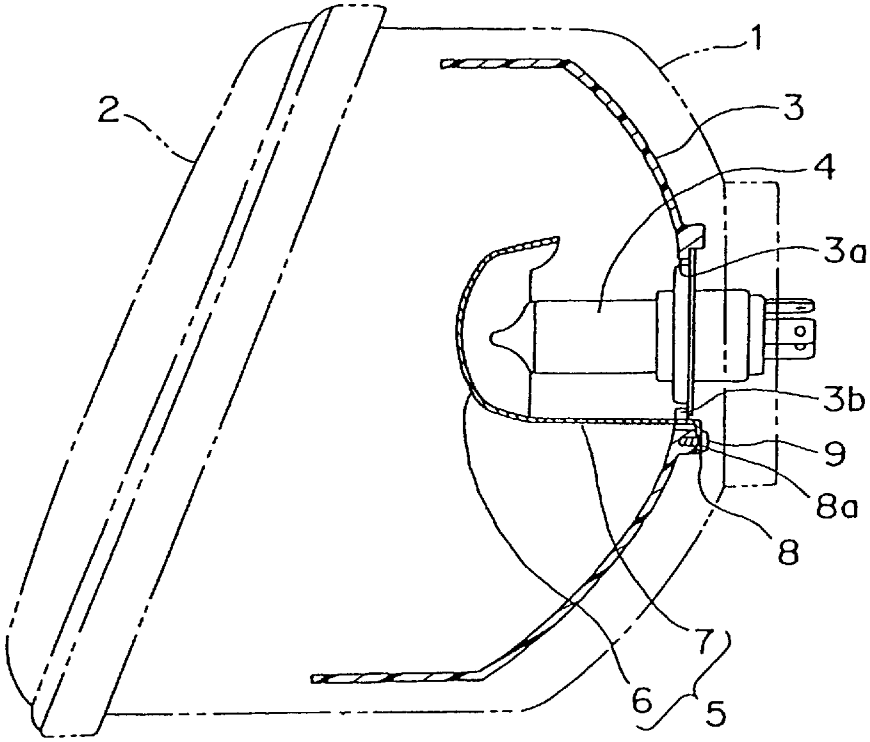
FIG. 12 PRIOR ART
FIG. 12 is a vertical cross sectional view of a conventional headlamp.
Figure 12:
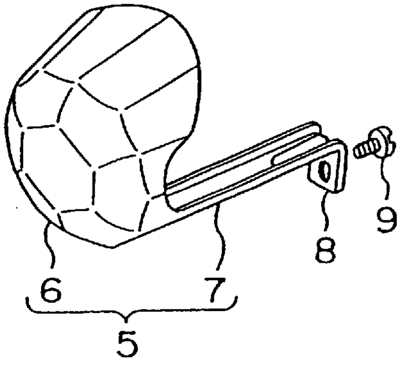
FIG. 12 PRIOR ART
Figure 12:
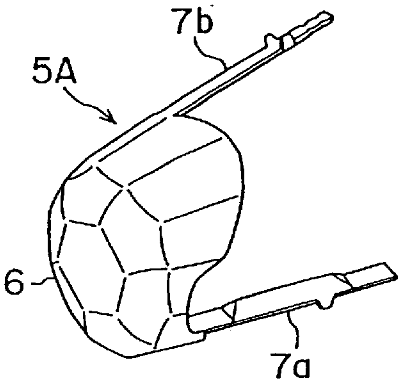
FIG. 12 PRIOR ART

More specifically, as shown in FIG. 10, when the engaging claws 126 of the leg 120 of the light shielding shade 100 are brought into contact with the right-angle stepped portions 220 of the boss 19, and as a result the leg 120 is inserted and secured into the leg insertion hole 200, then a leading end 114*a* of the skirt portion 114 of the light shielding shade 100 is positioned on a straight line 16*d* which connects a parting line 16*d* (a parting line between the effective reflecting surface 16*a* and the non-effective reflecting surface 16*c*) of the effective reflecting surface 16*a* and a rear end portion 15*a*, of the low-beam-forming filament 15*a*.

Furthermore, as shown by the imaginary two-dot lines in FIG. 10, for a headlamp that uses a reflector 16' (instead of the reflector 16), that has a larger effective reflecting surface 16*a*' than the effective reflecting surface 16*a* and further has a similar figure to the effective reflecting surface 16*a*, the positions of right-angle stepped portions 220' which are provided in the boss 19' of the new reflector 16' are offset by the amount of δ compared to the position at which the right-angle stepped portions 220 are formed. As a result, a leading end 114*a*' of a skirt portion 114' of the light shielding shade is positioned on a straight line 16*d*1' which connects a parting line 16*d*' (a parting line between an effective reflecting surface 16*a*' and a non-effective reflecting surface 16*c*') of the effective reflecting surface 16*a*' and the leading end portion 15*a*1 of the low-beam-forming filament 15*a*. In FIG. 10, each element of the light shielding shade 100' which is provided in the reflector 16' and is the same as the light shielding shade 100 is labeled with a marking "'".

As described above, for the reflector that has the same F value of the effective reflecting surface, it is preferable that the light shielding shade is positioned forward as the size of the reflector increases. On the other hand, for the reflector that has the same size, it is preferable that the light shielding shade is positioned forwards as the F value decreases. Accordingly, the positions of the right-angle stepped portions 220 provided in the reflector and arranged so as to set the distance of insertion of the leg 120 of the light shielding shade 100 are offset to a predetermined position in the longitudinal direction of the reflector so as to correspond to the difference in the effective reflecting surface and the F value. As a result, the light shielding shade of the same type can be employed for a reflector that has a different effective reflecting surface or a different F value.

The reference numeral 40 shown in FIG. 1 represents an extension reflector. The extension reflector 40 is disposed between the front opening of the lamp body 10 and the front lens 12 and extends so as to cover the gap between the reflector 16 and the lamp body 10. Like the reflector 16, the surface of the extending reflector 40 is subjected to an aluminum evaporation process. Thus, the appearance of the overall body of the lamp chamber can be made so as to have a depth in a metal color during the lamp is shut off, and the quality of the appearance is improved Furthermore, an opening 11 used for replacing the bulb is formed at a position facing the bulb insertion hole 17 provided in the rear wall of the lamp body 10. An extensible rust and water preventive cover 50 made of rubber is installed between the opening 11 and the connector of the bulb 14.

Figure 11:
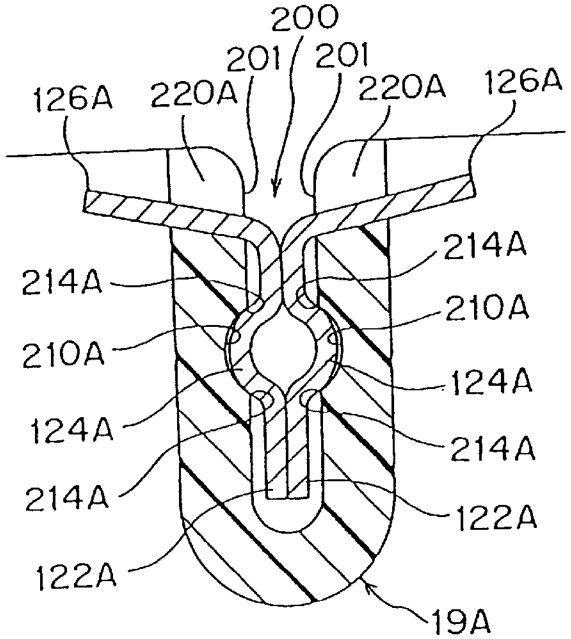
FIG. 11 is an enlarged horizontal cross sectional view of the light shielding shade according to the second embodiment of the present invention.

FIG. 11 shows a second embodiment of the present invention, illustrating the leg of a light shielding shade inserted into a leg insertion hole. FIG. 11 substantially corresponds to FIG. 7 of the first embodiment.

In the first embodiment, the vertical cross sections of the plate-like extending portions 122 that constitutes the leg 120 are formed into wedge shapes, so that the plate-like extending portions 122, as well as the expanded portions 124, possess the functions of plate springs. In the second embodiment, however, the vertical cross sections of the plate-like extending portions 122A are formed flat, so that only the expanded portions 124A formed in the plate-like extending portions 122A have the plate-spring function.

The size of each of the holding grooves 210A and the expanded portions 124A in the second embodiment is determined so that the expanded portions 124A are held at positions 214A adjacent to the ends of the holding groove 210A in the circumferential direction.

In addition, the engaging claws 126A of the plate-like extending portions 122A and stepped portions 220A of the boss 19A are in an inclined shape with respect to the horizontal direction.

The other structures of the second embodiment are the same as those of the first embodiment, and the description thereof is omitted.

In the above two embodiments, the light source is a double-filament bulb incorporating, in its glass bulb, the low-beam-forming filament 15*a* and the main-beam-forming filament 15*b*. The light source, however, may be a bulb that incorporates, in its glass bulb, a single filament In this single-filament bulb, the positions of the right-angle stepped portions provided in the boss are determined so that the leading end of the skirt portion of the light shielding shade is positioned on a straight line between the parting line of the effective reflecting surface of the reflector and the rear end of the filament.

Also, the shade body of the light shielding shade of the shown embodiments has the ski portion 114 formed around the designed portion 112. However, the present invention is applicable to a headlamp that includes a light shielding shade having only the designed portion, which covers the bulb, and no the skirt portion.

Further, the above embodiments are described with reference to the headlamp in which the reflector 16 having the bulb 14 as the light source inserted thereinto is inclined with respect to the lamp body by an aiming mechanism. The present invention is, however, also applicable to a unit-movable type headlamp in which a reflector is integrally formed inside the lamp body, and a reflector unit that comprises a bulb integrally installed in the lamp body (the reflector) is inclined with respect to a lamp housing by an aiming mechanism.

As can be understood from the foregoing description, according to the lamp for a vehicle of the present invention, the light shielding shade is mounted in the reflector by a simple operation: the leg of the light shielding shade is inserted into the leg insertion hole of the reflector, and the rear end of the extending plate-like extending portion which constitutes the leg is bent so as to be on the rear surface of the reflector. Thus, the light shielding shade can be installed quite easily; and since the number of elements can be reduced, the overall structure of the lamp is simple.

In the present invention, the leg of the light shielding shade is formed by laminating two plate-like extending portions. Therefore, the leg has high rigidity, and deflection of the light distribution owing to vibrations the vehicle is running can be prevented. Therefore, appropriate light distribution can be maintained for a long time.

Since the laminated two plate-like extending portions provide as a whole a spring function, the leg of the light shielding shade can be easily installed in the leg insertion hole and is held securely in the leg insertion hole.

In addition, the contact pressure generated between the expanded portions of the leg and the holding grooves of the reflector is uniform in the circumferential direction, and the expanded portions are reliably held in the holding grooves. Accordingly, appropriate light distribution can be maintained for a long time.

Since the leg can be smoothly inserted into the leg insertion hole, the light shielding shade can be easily mounted.

In addition, since the end portion of the leg is inserted into the leg insertion hole easily and bent simply on the rear surface of the reflector, the light shielding shade can be installed quickly.

Furthermore, the quantity of light which is reflected by the effective reflecting surface of the reflector increases. Accordingly, the efficiency of the use of light can be improved.

The vibrations of the light shielding shade produced during the vehicle is running can be reduced, and deflection of light distribution can be prevented, thus allowing the driver of the vehicle to have satisfactory visibility.

The leg inserted into the leg insertion hole is automatically brought to an appropriate insertion position. Therefore, the light shielding shade can be smoothly installed.

Moreover, since the rigidity and strength of the leg can be raised and the leg can reliably be secured in the circumferential direction, appropriate light distribution can be maintained for a long time.

In addition, since the process for machining the molding surface of a mold for molding the reflector becomes simple, the cost for manufacturing the mold can be reduced; and since the leg insertion hole (the slit) and the holding groove can be molded with excellent moldability, the leg of the light shielding shade can reliably be held.

Furthermore, the cap-shape designed portion of the light shielding shade is obtained by a drawing process and the skirt portion and the leg is obtained by a punching (cutting) work and a bending work. Therefore, compared to the conventional manufacturing process that involves a pressing process involving a sequential conveying process and an independent manufacturing process, the pressing process employed in the manufacture of the light shielding shade of the present invention involves only the sequential conveying process; and the process for manufacturing the light shielding shade is simple.

Furthermore, the light shielding shade is commonly used for reflectors of different sizes of the effective reflecting surface and F valued. Therefore, the cost of the lamp can be reduced. The common light shielding shade can be mounted by merely shifting, in the longitudinal direction of the reflector, the positions of the right-angle stepped portions which are provided in the boss so as to set the distance of insertion of the leg. Therefore, the design of the reflector and the manufacturing of the mold can be facilitated.

In addition, the positions of the right-angle stepped portions provided in the boss can be easily specified for each reflector having a different shape. Therefore, the design of the reflector and manufacturing of the mold can be facilitated.

What is claimed is:

1. A lamp for a vehicle comprising a lamp chamber provided therein with a reflector, a light source disposed in front of said reflector and a light shielding shade disposed in front of and underneath said light source, said light shielding shade comprising a shade body and a leg which are integrally formed from a thin metal plate so that said shade body serves as a light shielding section and said leg extends rearwards from said shade body in substantially a horizontal direction and so that a rear end of said leg is inserted and secured to a leg insertion hole which is formed in said reflector and extends in a longitudinal direction of said reflector, and said light shielding shade is supported in a cantilever manner, said lamp being characterized in that:

said leg of said light shielding shade is obtained by laminating two plate-like extending portions, opposite expanded portions expanding outwards and extending in a direction in which said leg extends are formed in substantially central portions in a widthwise direction of said plate-like extending portions, holding grooves for holding said expanded portions of said leg are provided in said leg insertion hole, a rear end portion of said extending leg inserted from a front side of said reflector to a predetermined insertion limit in said leg insertion hole is bent on a rear surface of said reflector so that said leg is secured in said leg insertion hole.

2. A lamp for a vehicle according to claim 1, characterized in that each of said plate-like extending portions which constitute said leg of said light shielding shade is formed so that a cross section thereof is formed into a wedge shape facing sideways and said plate-like extending portions project outwards from each other.

3. A lamp for a vehicle according to claim 2, characterized in that each of said expanded portions is formed into a circular arc shape, each of said holding grooves is formed so as to have a circular-arc shape which substantially fits to outside shapes of said expanded portions, and a plurality of recess grooves extending in a longitudinal direction of said holding grooves are formed in an inner surface of said holding grooves at substantially the same intervals in a circumferential direction of said holding grooves.

4. A lamp for a vehicle according to claim 3, characterized in that a rear end of each of said plate-like extending portions have tongue-shaped areas which have cut portions formed opposite to each other in a widthwise direction and arranged so as not to overlap each other.

5. A lamp for a vehicle according to claim 4, characterized in that a widthwise direction of each of said plate-like extending portions that form said leg of said light shielding shade is set to be vertical.

6. A lamp for a vehicle according to claim 5, characterized in that a front surface of said reflector is provided with a projecting boss formed therein with said leg insertion hole, engaging claws which form a cross section of said leg to be a T-shape are provided at corresponding side ends of said plate-like extending portions which constitutes said leg, and right-angle stepped portions for setting a distance of insertion of said leg are formed on a front end of said boss so as to serve as an insertion limit position so that a contact and engagement of said engaging claws is made when said leg is inserted into said leg insertion hole.

7. A lamp for a vehicle according to claim 6, characterized in that said reflector is provided with a light-source insertion hole for holding said inserted light source, and said leg insertion hole is formed by a slit opened in side surface of said light-source insertion hole.

8. A lamp for a vehicle according to claim 7, characterized in that said shade body comprises a cap-shape designed portion for shielding direct light directly radiated forwards from said light source and a skirt portion formed into a skirt-like shape around said designed portion and arranged so as to shield light which travels to a non-effective reflecting surface of said reflector, and said skirt portion is formed into the skirt-like shape by bending a plurality of elongated and divided portions radially extending from an outer periphery of said designed portion.

9. A lamp for a vehicle according to claim 6, characterized in that said right-angle stepped portions provided in said boss so as to set said distance of insertion of said leg are formed at predetermined offset positions in a longitudinal direction of said reflector so as to correspond to differences in size of an effective reflecting surface of said reflector and F value.

10. A lamp for a vehicle according to claim 9, characterized in that said right-angle stepped portions are formed at predetermined positions in a longitudinal direction of said reflector so that said contact and engagement of said engaging claws to said right-angle stepped portions causes an outer periphery of said shade body to be positioned on a straight line which connects a predetermined position adjacent to a central portion of said light source and a parting line of said effective reflecting surface of said reflector.

11. A lamp for a vehicle according to claim 1, characterized in that each of said expanded portions is formed into a circular arc shape, each of said holding grooves is formed so as to have a circular-arc shape which substantially fits to outside shapes of said expanded portions, and a plurality of recess grooves extending in a longitudinal direction of said holding grooves are formed in an inner surface of said holding grooves at substantially the same intervals in a circumferential direction of said holding grooves.

12. A lamp for a vehicle according to claim 1, characterized in that a rear end of each of said plate-like extending portions have tongue-shaped areas which have cut portions formed opposite to each other in a widthwise direction and arranged so as not to overlap each other.

13. A lamp for a vehicle according to claim 1, characterized in that a widthwise direction of each of said plate-like extending portions that form said leg of said light shielding shade is set to be vertical.

14. A lamp for a vehicle according to claim 1, characterized in that a front surface of said reflector is provided with a projecting boss formed therein with said leg insertion hole, engaging claws which form a cross section of said leg to be a T-shape are provided at corresponding side ends of said plate-like extending portions which constitutes said leg, and right-angle stepped portions for setting a distance of insertion of said leg are formed on a front end of said boss so as to serve as an insertion limit position so that a contact and engagement of said engaging claws is made when said leg is inserted into said leg insertion hole.

15. A lamp for a vehicle according to claim 14, characterized in that said right-angle stepped portions provided in said boss so as to set said distance of insertion of said leg are formed at predetermined offset positions in a longitudinal direction of said reflector so as to correspond to differences in size of an effective reflecting surface of said reflector and F value.

16. A lamp for a vehicle according to claim 15, characterized in that said right-angle stepped portions are formed at predetermined positions in a longitudinal direction of said reflector so that said contact and engagement of said engaging claws to said right-angle stepped portions causes an outer periphery of said shade body to be positioned on a straight line which connects a predetermined position adjacent to a central portion of said light source and a parting line of said effective reflecting surface of said reflector.

17. A lamp for a vehicle according to claim 1, characterized in that said reflector is provided with a light-source insertion hole for holding said inserted light source, and said leg insertion hole is formed by a slit opened in side surface of said light-source insertion hole.

18. A lamp for a vehicle according to claim 1, characterized in that said shade body comprises a cap-shape designed portion for shielding direct light directly radiated forwards from said light source and a skirt portion formed into a skirt-like shape around said designed portion and arranged so as to shield light which travels to a non-effective reflecting surface of said reflector, and said skit portion is formed into the skirt-like shape by bending a plurality of elongated and divided portions radially extending from an outer periphery of said designed portion.

* * * * *